US009289090B2

(12) United States Patent
Yuan et al.

(10) Patent No.: US 9,289,090 B2
(45) Date of Patent: Mar. 22, 2016

(54) COOKTOP APPLIANCES WITH INTELLIGENT RESPONSE TO COOKTOP AUDIO

(71) Applicant: General Electric Company, Schenectady, NY (US)

(72) Inventors: Peijian Jefferson Yuan, Louisville, KY (US); Eric Xavier Meusburger, Louisville, KY (US)

(73) Assignee: General Electric Company, Schenectady, NY (US)

( * ) Notice: Subject to any disclaimer, the term of this patent is extended or adjusted under 35 U.S.C. 154(b) by 23 days.

(21) Appl. No.: 14/337,272

(22) Filed: Jul. 22, 2014

(65) Prior Publication Data

US 2016/0022086 A1 Jan. 28, 2016

(51) Int. Cl.
*G06F 17/00* (2006.01)
*A47J 27/62* (2006.01)
*G10L 25/51* (2013.01)

(52) U.S. Cl.
CPC . *A47J 27/62* (2013.01); *G10L 25/51* (2013.01)

(58) Field of Classification Search
CPC ............. G05D 23/27535; H05B 6/062; H05B 1/0258; H05B 1/269; H05B 2213/04; H05B 2213/07; H05B 3/746
See application file for complete search history.

(56) References Cited

U.S. PATENT DOCUMENTS 4,869,233 A 9/1989 Stulen et al.
5,067,474 A 11/1991 Chi
6,118,104 A 9/2000 Berkcan et al.
9,027,469 B2 * 5/2015 Smrke ............. G05D 23/27535
426/231
2009/0173731 A1 * 7/2009 Nagamitsu ............ H05B 6/062
219/622
2011/0166830 A1 7/2011 Lehmann
2014/0365018 A1 * 12/2014 Kusukame .............. G06F 13/00
700/276

FOREIGN PATENT DOCUMENTS

KR 20080001425 A 1/2008

OTHER PUBLICATIONS

Ellis, Dan. "Pattern Recognition Applied to Music Signals" LearningAce.com. Jul. 1, 2003.Web.Jun. 12, 2014. 30 pages.

Pertusa et al. "Pattern recognition algorithms for polyphonic music transcription" PRIS 2004: Pattern Recognition in Information Systems, Porto, Portugal, 2004, p. 80-89.

Eikvil et al. "Pattern Recognition in Music" Norweigen Computing Center, Oslo, Norway, Feb. 2002, p. 1-40.

Aucouturier et al. "The Bag-of-frames Approach to Audio Pattern Recognition: A Sufficient Model for Urban Soundscapes But Not for Polyphonic Music", Journal of the Acoustical Society of America, 122, 2, Feb. 2, 2007, p. 881-891.

* cited by examiner

*Primary Examiner* — Andrew C Flanders

(74) *Attorney, Agent, or Firm* — Dority & Manning, P.A.

(57) ABSTRACT

Cooktop appliances and methods of operation for intelligent response to cooktop audio are provided. One example cooktop appliance includes microphones for capturing an audio signal at the cooktop. A controller can compare the audio signal to a plurality of cooking event sounds representative of different cooking events. If the audio signal is matched to one of the cooking event sounds, operations responsive to the particular identified cooking event can be performed.

18 Claims, 5 Drawing Sheets

COOKTOP APPLIANCES WITH INTELLIGENT RESPONSE TO COOKTOP AUDIO

FIELD OF THE INVENTION

The present disclosure relates generally to cooktop appliances. In particular, the present disclosure is directed to cooktop appliances and methods of operation for intelligent response to cooktop audio.

BACKGROUND OF THE INVENTION

In many circumstances, preparation of food items with a cooktop appliance can be challenging. For example, for novice chefs, determining the proper doneness of foods can be difficult. As another example, for a user that is distracted by other tasks, such as, for example, chopping or dicing other ingredients, preparing the dining environment, or performing child care, certain items may not be properly cooked due to inattentiveness.

As one example, if a user is distracted or performing another task, the user may fail to notice that a pot of water or other liquid has reached a boiling state. Failure to reduce the heat once the liquid has achieved the boiling state can cause a number of problems including, for example, overcooking of the dish, splatter of liquid onto the cooktop surface, or even complete evaporation of the liquid, a condition referred to as "boil-dry," which can potentially lead to ignition of a fire. Therefore, systems and methods for cooking event detection (e.g. boil detection) at a cooktop are desirable.

Certain existing systems have been proposed for performing detection of boiling and other cooking events. As an example, motion sensors can be used to detect motion at the cooktop. However, these systems suffer from significant problems with accuracy, as human motion (e.g. stirring) or rising steam trigger the sensor and leads to a false positive of a boiling event.

As another example, other existing systems may use temperature sensors to attempt to detect cooking events. However, these systems can suffer from problems with accuracy and granularity, as well. For example, temperature sensors in a generally heated environment such as a cooktop may lead to significant numbers of errors.

Therefore, cooktop appliances providing intelligent response to cooktop audio are desirable.

BRIEF DESCRIPTION OF THE INVENTION

Aspects and advantages of the invention will be set forth in part in the following description, or may be obvious from the description, or may be learned through practice of the invention.

One aspect of the present disclosure is directed to a method for controlling a cooktop appliance. The method includes receiving, from one or more acoustic sensors positioned at a cooktop of the cooktop appliance, an audio signal. The method includes comparing an amplitude of the audio signal to an amplitude of each of a plurality of cooking event sounds. The plurality of cooking event sounds are previously stored in a memory and respectively correspond to a plurality of different cooking events. The method includes comparing a frequency of the audio signal to a frequency of each of the plurality of cooking event sounds. The method includes identifying a match between the audio signal and one of the plurality of cooking event sounds based at least in part on the comparison of the amplitudes and the comparison of the frequencies. The method includes, in response to identifying the match, performing one or more operations associated with the cooking event associated with the cooking event sound to which the audio signal was matched.

Another aspect of the present disclosure is directed to a cooktop appliance. The cooktop appliance includes a cooktop. The cooktop appliance includes one or more acoustic sensors. The one or more acoustic sensors are positioned to collect an audio signal present at the cooktop. The cooktop appliance includes a first database storing a plurality of cooking event sounds that respectively correspond to a plurality of different cooking events. The cooktop appliance includes a second database storing a plurality of operations respectively associated with the plurality of different cooking events. The cooktop appliance includes a controller. The controller receives the audio signal from the one or more acoustic sensors. The controller compares the received audio signal to each of the plurality of cooking event sounds. The controller identifies a match between the received audio signal and one of the plurality of cooking event sounds based at least in part on the comparison, such that one of the plurality of different cooking events is identified as occurring at the cooktop. In response to the cooking event identified as occurring at the cooktop, the controller performs the operation associated with the identified cooking event in the second database.

Another aspect of the present disclosure is directed to one or more non-transitory, computer-readable media storing instructions that, when executed by one or more processors, cause the one or more processors to perform operations. The operations include obtaining an audio signal. The audio signal describes audio at a cooktop of a cooktop appliance. The operations include comparing an amplitude and a frequency of the audio signal against an amplitude and a frequency of each of a plurality of cooking event sounds. The plurality of cooking event sounds respectively correspond to a plurality of different cooking events. The operations include identifying, based at least in part on the comparing, a match between the audio signal and a first cooking event sound of the plurality of cooking event sounds. The operations include, in response to the match, performing one or more operations associated with the first cooking event sound.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
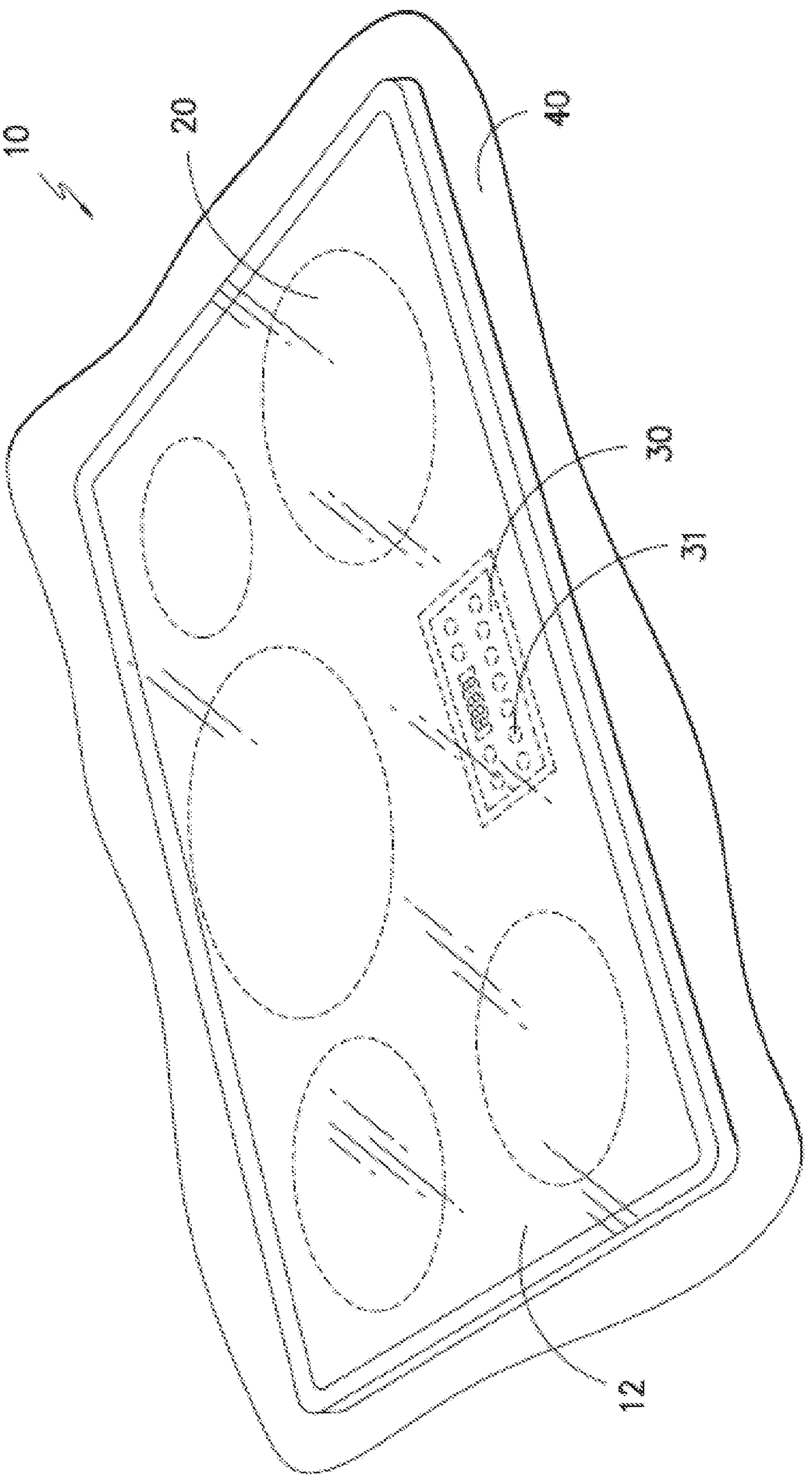
FIG. 1 depicts an example cooktop appliance according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 depicts an example cooktop appliance according to an example embodiment of the present disclosure. The cooktop appliance includes a cooktop 10. Cooktop 10 is an induction cooktop. However, cooktop 10 is provided by way of example only. The present disclosure can be applied to cooktop appliances having any form of cooktop elements, including, for example, cooktop appliances having one or more gas burners, cooktop appliances having one or more above-surface or below-surface electric heating elements, or other cooktop appliances, or combinations thereof.

Cooktop 10 may be installed in a chassis 40 and in various configurations such as in cabinetry in a kitchen, coupled with one or more ovens or as a stand-alone appliance. Chassis 40 may be grounded. Cooktop 10 includes a horizontal surface 12 that may be glass or ceramic. In other embodiments, the horizontal surface 12 of the cooktop 10 can be formed from a metallic material, such as steel.

An induction coil 20 may be provided below horizontal surface 12. Cooktop 10 may include a single induction coil or a plurality of induction coils, as shown in FIG. 1. The induction coils can be energized by providing a high frequency waveform across the coil, thereby causing the coil to generate a magnetic field that can induce currents in a metallic vessel placed upon horizontal surface 20 adjacent to the coil 20.

Generally, however, cooktop 10 and other cooktops of the present disclosure can operate according to any suitable control scheme.

A user interface 30 may have various configurations and controls may be mounted in other configurations and locations other than as shown in FIG. 1. In the illustrated embodiment, the user interface 30 may be located within a portion of the horizontal surface 30, as shown. Alternatively, the user interface may be positioned on a vertical surface near a front side of the cooktop 10 or anywhere a user may locate during operation of the cooktop.

The user interface 30 may include a capacitive touch screen input device component 31. The input component 31 may allow for the selective activation, adjustment or control of any or all induction coils 20 as well as any timer features or other user adjustable inputs. For example, in some embodiments, the user interface 30 can be operated to edit or otherwise manipulate audio signals captured at the cooktop and store such signals as cooking event sounds for future use and identification of cooking events. In other embodiments, audio signal editing is performed by the user on a separate device connected to the cooktop appliance over a network.

One or more of a variety of electrical, mechanical or electro-mechanical input devices including rotary dials, push buttons, and touch pads may also be used alternatively to or in combination with the capacitive touch screen input device component 31. The user interface 30 may include a display component, such as a digital or analog display device designed to provide operational feedback to a user.

One or more acoustic sensors (not depicted) can be positioned at or adjacent to the cooktop 10. The acoustic sensors can be microphones. For example, the one or more acoustic sensors can be positioned at or adjacent to the horizontal surface 12. In some embodiments, for example, the one or more microphones can be secured or mounted to the horizontal surface 12 or other components of the cooktop 10 (e.g. mounted below the horizontal surface 12). In particular, in some embodiments, the acoustic sensors can be mounted to the cooktop 10 (e.g. horizontal surface 12) such that no air gap exists between the acoustic sensors and the cooktop 10 (e.g. horizontal surface 12).

In other embodiments that include one or more gas burners, the acoustic sensors can be respectively installed adjacent to or mounted on one or more cooking vessel supports. For example, the acoustic sensors can be respectively located at or adjacent to a location at the cooktop surface where the one or more cooking vessel supports contact the cooktop surface. In such fashion, audio can transmitted through the cooking vessel, through the vessel support and cooktop surface, and then directly coupled to the acoustic sensor, thereby providing enhanced audio signal integrity and performance.

Figure 2:
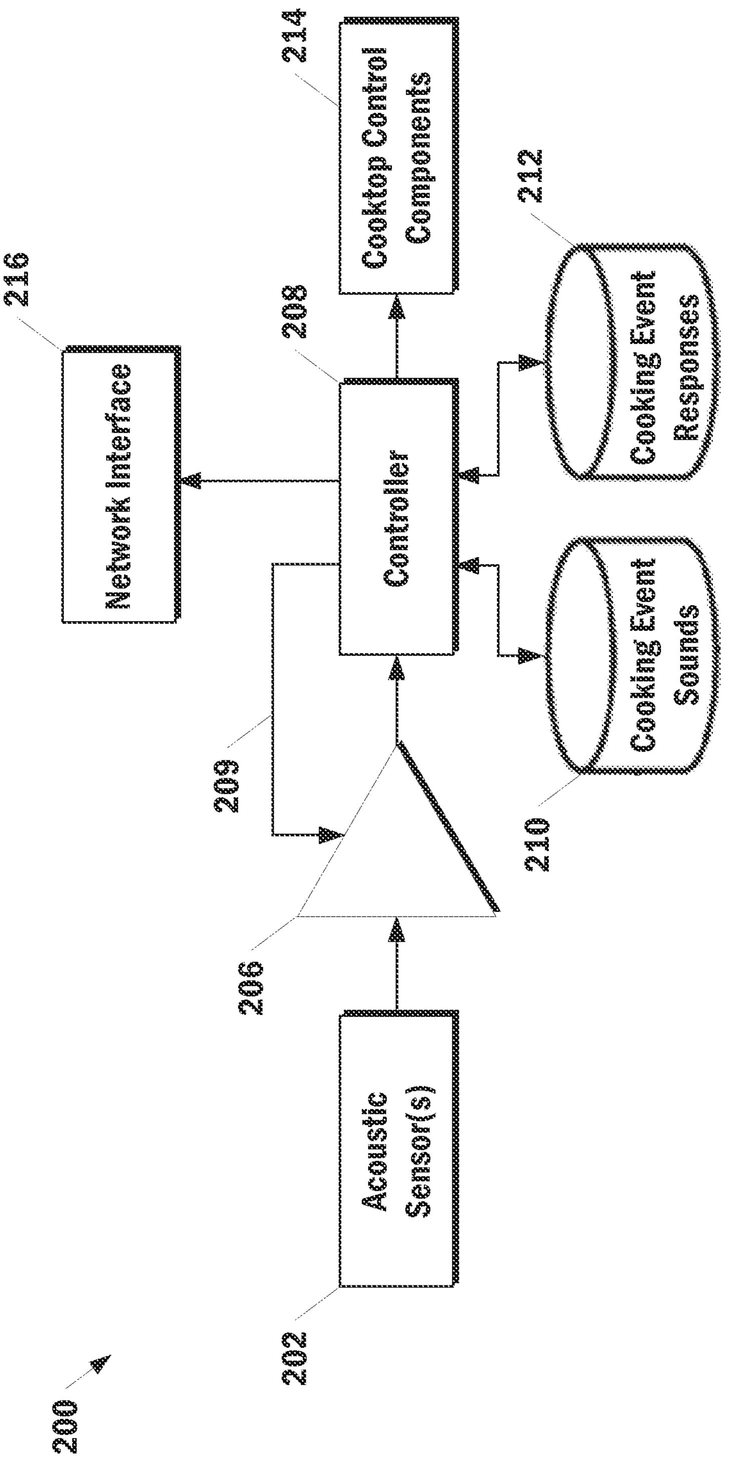
FIG. 2 depicts an example cooktop appliance control system according to an example embodiment of the present disclosure.

FIG. 2 depicts an example cooktop appliance control system 200 according to an example embodiment of the present disclosure. Control system 200 can provide an intelligent response to cooktop audio.

Control system 200 can include one or more acoustic sensors 202. The acoustic sensors can be microphones such as, for example, ceramic microphones.

In some embodiments, the acoustic sensors 202 can be positioned at or adjacent to a cooktop surface. In some embodiments, for example, the one or more acoustic sensors can be secured or mounted to the cooktop surface such that no air gap exists between the acoustic sensors and the cooktop surface. In such fashion, audio events occurring at the cooktop will be captured and transmitted by the cooktop surface directly to the acoustic sensors 202.

When a plurality of acoustic sensors 202 are used, in some embodiments, their output can be combined and treated as a single audio signal. Alternatively, in other embodiments, the output from each acoustic sensor can be processed separately in parallel. For example, the output from each acoustic sensor can be separately amplified and then processed by a controller 208.

Control system 200 can also include one or more amplifiers 206. The one or more amplifiers 206 can receive the audio signal from the acoustic sensors 202, amplify the signal, and provide it to the controller 208. For example, the amplifier 206 can provide the amplified signal to an analog-to-digital converter included in the controller 208. In other embodiments, the analog-to-digital converter may be a separate component from controller 208. Alternatively, the amplifier 206 can provide the amplified signal to the controller 208 via a general-purpose input/output pin of the controller 208.

In some embodiments, amplifier 206 can be gain controlled by controller 208 via feedback line 209. For example, the controller 208 can gain control the amplifier 206 based on the average amplitude of the amplified audio signal provided by the amplifier 206 to the controller 208.

In some embodiments, control system 200 can also include one or more filters that filter the audio signal before or after amplification. As an example, in some embodiments, the one or more filters can be one or more band-pass filters that pass audio frequencies associated with common cooking events. For example, the band-pass filters can filter out low values associated with air noise and high values associated with user physical contact with the cooktop. The filters can be analog filters or can be multi-function digital filters that are implemented by the controller 208. Furthermore, one or more properties (e.g. pass frequencies) can be modifiable by the controller 208. Digital filters implemented by the controller 208 may also have self-study functionality.

Controller 208 can include one or more processors and a memory. The processor(s) can be any suitable processing device, such as a microprocessor, microcontroller, integrated circuit, or other suitable processing device. The memory can include any suitable computing system or media, including, but not limited to, non-transitory computer-readable media, RAM, ROM, hard drives, flash drives, or other memory devices, or combinations thereof. The memory can store information accessible by the processor(s), including instructions that can be executed by processor(s). The instructions can be any set of instructions that when executed by the processor(s), cause the processor(s) to provide desired functionality. Memory can also store various forms of data. The memory can be included in the controller 208, can be located remotely and accessed during operation, or some combination thereof.

Controller 208 can be operatively connected to a plurality of databases, including, for example, a cooking event sounds database 210 and a cooking event responses database 212.

Cooking event sounds database 210 can store and/or provide a plurality of cooking event sounds. In particular, the plurality of cooking event sounds can respectively correspond to a plurality of cooking events. Thus, as an example, one of the cooking event sounds may be the sound of boiling water, as would be captured by the acoustic sensors 202. As another example, one of the cooking event sounds may be the sound of a boil dry condition, the sound of a simmering sauce, the sound of a boil dry condition, a particular doneness of a food item (e.g. steak), splatter of food items on the cooktop surface, sizzling sounds, or other sounds that correspond to other cooking events. In some embodiments, multiple cooking event sounds stored in database 210 can correspond to the same cooking event.

As will be discussed further below, cooking event sounds database 210 can be supplemented with additional cooking event sounds. For example, certain portions of an audio signal obtained by acoustic sensors 202 can be selected (e.g. edited) by a user of the cooktop appliance and stored in database 210 as a supplemental cooking event sound. Thus, users may be provided with the ability to control the cooking event sounds against which collected cooktop audio is compared.

As another example, cooking event sounds can be downloaded or otherwise received over a network from mobile devices, servers, and/or other cooktop appliances. Thus, users can share or obtain additional cooking event sounds from various data sources to use on their own cooktop appliance.

In particular, in some embodiments, control system 200 can further include a network interface 216 for communicating over a network (e.g. the Internet). Network interface 216 can include any suitable components for interfacing with one more networks, including for example, transmitters, receivers, ports, controllers, antennas, or other suitable components.

Cooking event responses database 212 can store a plurality of operations to be performed upon the matching of audio occurring at the cooktop with one of the cooking event sounds stored in database 210. In particular, upon matching the audio signal received by acoustic sensors 202 at the cooktop to a particular cooking event sound, controller 208 can consult cooking event responses database 212 to identify an appropriate action to perform in response to the cooking event identified as occurring at the cooktop. In some embodiments, cooking event responses 212 can be a lookup table.

Further, although databases 210 and 212 are depicted in FIG. 2 as being separate entities, in some embodiments, databases 210 and 212 can be a single storage entity.

Controller 208 can control various aspects of the cooktop appliance. In particular, controller 208 can be in operative communication with various cooktop control components 214. For example, controller 208 can communicate with various cooktop control components 214 to control an energization level of one or more cooktop elements or other heating or cooking components of the cooktop.

As an example, in the instance that the cooktop appliance is an induction cooktop, cooktop control components 214 can include an inverter that controls the high frequency signal applied across the induction coil(s). Thus, controller 208 can control the amount of energy transferred by the induction coil to a cooking vessel (e.g. pan) by controlling or otherwise communicating with the inverter to alter the high frequency signal.

As another example, in the instance that the cooktop appliance includes electric heating elements, controller 208 can control various cooktop control components 214 to adjust a voltage or current that are applied to the heating elements, thereby controlling the amount of heat/energy provided by such elements to a cooking vessel.

As yet another example, in the instance that the cooktop appliance is a gas burner cooktop, cooktop control components 214 can include one or more valves controlling a volume of gas flow to the burner. Thus, by opening or closing the valves, controller 208 can control the amount of heat/energy provided by the gas burner to a cooking vessel.

Controller 208 can communicate with various other cooktop control components 214 to control various other parameters of the operation of the cooktop appliance, as well. In addition, controller can send and receive various communications with various devices (e.g. a server or a user computing device such as a smartphone or tablet) over a network via network interface 216. Thus, for example, controller 208 may send an alarm message to a user computing device upon identification of a particular cooking event. As a further example, the user may respond to the alarm message with various desired operations for the cooktop appliance to perform (e.g. reduce or eliminate heat).

Figure 3:
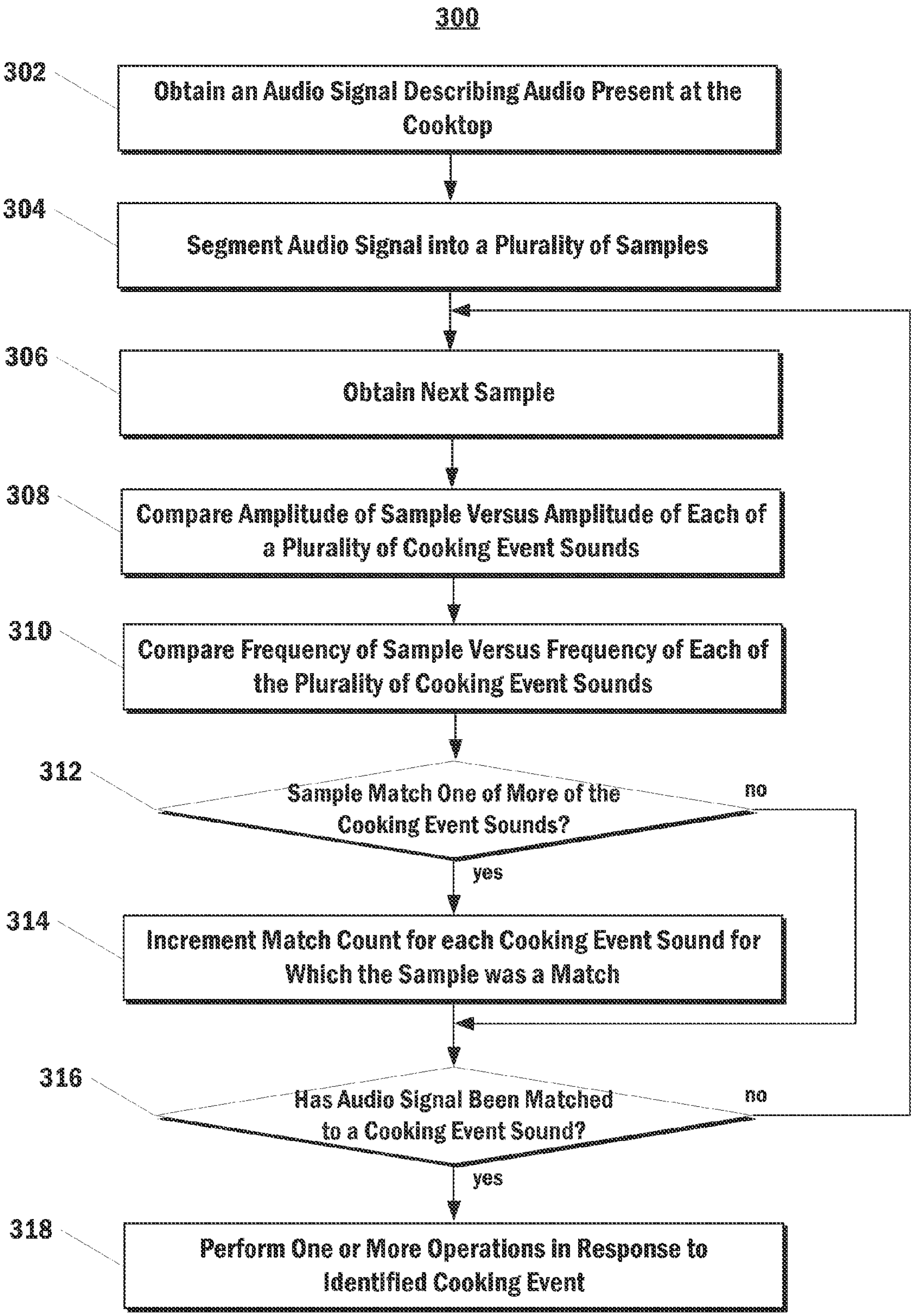
FIG. 3 depicts a flowchart of an example method for operating a cooktop appliance according to an example embodiment of the present disclosure.

FIG. 3 depicts a flowchart of an example method (300) for operating a cooktop appliance according to an example embodiment of the present disclosure. Although FIG. 3 depicts steps performed in a particular order for purposes of illustration and discussion, various steps of method (300) can be omitted, rearranged, combined, performed simultaneously, and/or adapted in various ways without deviating from the scope of the present disclosure.

At (302) an audio signal can be obtained that describes audio present at the cooktop. For example, the audio signal can be audio that was collected by one or more acoustic sensors mounted at the cooktop. The audio signal can be amplified then provided to a controller implementing method (300). In some embodiments, the audio signal can be continuously saved in memory with various time flags and processed in a first in first out fashion.

At (304) the audio signal can be segmented into a plurality of samples. For example, each segment can have a defined duration. Therefore, for example, the audio signal can be spliced into the plurality of samples.

In some embodiments, the plurality of samples can be overlapping. For example, the plurality of samples can be selected so as to perform a sliding window sampling technique. In such fashion, estimation of a start point of a particular sound captured in the audio signal is not required.

At (306) the next sample can be obtained. In particular, in some embodiments of the present disclosure, each sample of the audio signal can be considered sequentially. Thus, at the first instance of (306), a first sample can be obtained. At subsequent instances of (306), additional samples can be obtained sequentially.

According to an aspect of the present disclosure, each sample of the audio signal can be compared to each of a plurality of pre-stored cooking event sounds. Identified matches between one or more of the samples and one or more of the cooking event sounds can be used to identify a cooking event occurring at the cooktop and respond appropriately.

Figure 4:
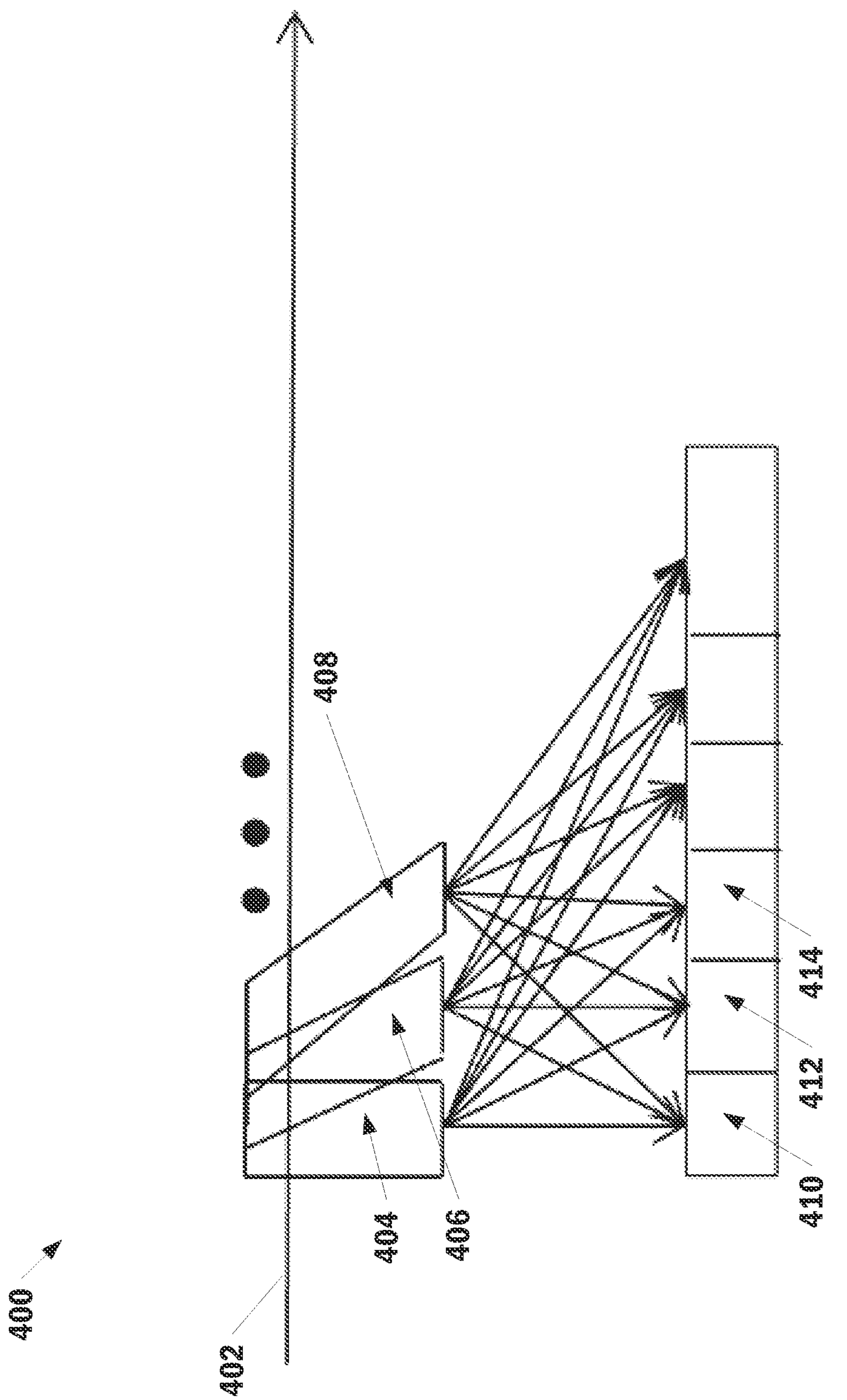
FIG. 4 depicts a simplified graphical diagram of comparing audio signal samples to cooking event sounds according to an example embodiment of the present disclosure.

As an example, FIG. 4 depicts a simplified graphical diagram 400 of comparing audio signal samples to cooking event sounds according to an example embodiment of the present disclosure. Graphical diagram 400 depicts an audio signal 402 as a horizontal line of data versus time. The audio signal 402 has been segmented into a plurality of samples, including samples 404, 406, and 408. As shown in FIG. 4, the samples can be overlapping.

Each of the samples is compared to each of a plurality of cooking event sounds, including cooking event sounds 410, 412, and 414. The samples can be compared sequentially or in parallel. Matches between a particular sample and cooking event sound (e.g. a match between sample 406 and cooking event sound 414) can be used to identify a particular cooking event occurring at the cooktop, as evidenced by the audio signal 402.

As an example, referring again to FIG. 3, at (308) an amplitude of the sample obtained at (306) can be compared versus an amplitude of each of a plurality of cooking event sounds. As an example, at (308) it can be determined whether the amplitude of the sample is within a threshold amount from an amplitude of one or more of the cooking event sounds. For example, respective average amplitudes across the whole of the sample and each cooking event sound can be used.

In some embodiments, comparing the amplitudes at (308) can include determining whether a first difference between the amplitude of the current sample and the amplitude of the cooking event sound minus a second difference between the amplitude of the previous sequential sample and the amplitude of the cooking event sound is less than a threshold value. Thus, if the difference in amplitude between the audio signal and the cooking event sound remains stable over time, regardless of value, then a match can be identified. In such fashion, signals that describe the same sound but at different amplitudes can be matched.

At (310) a frequency of the sample can be compared versus a frequency of each of the plurality of cooking event sounds. As an example, at (310) it can be determined whether the frequency of the sample is within a threshold amount from a frequency of one or more of the cooking event sounds. For example, respective average frequencies across the whole of the sample and each cooking event sound can be used.

In some embodiments, comparing the frequencies at (310) can include adjusting, for each of the plurality of cooking event sounds, a time axis of the cooking event sound to determine whether the frequency of the current sample is within a range of frequencies around the frequency of each cooking event sound.

At (312) it can be determined whether the sample matches one or more of the cooking event sounds. As an example, the sample can be determined to match a cooking event sound if the amplitude and/or the frequency of the sample respectively matches the amplitude and/or frequency of such cooking event sound. In other embodiments, both the amplitude and the frequency of the sample must match those of the cooking event sound for the sample to match the cooking event sound. In yet further embodiments, other criteria may be analyzed as well to determine sample matches.

If it is determined at (312) that the sample does not match any of the cooking event sounds, then method (300) can proceed to (316). However, if it is determined at (312) that the sample matches one or more at 314 of the cooking event sounds, then method (300) can proceed to (314).

At (314) a match count can be incremented for each cooking event sound for which the sample was a match. For example, the match count for each cooking event sound can serve as an indication of the number of samples of the audio signal that have been matched to such cooking event sound.

In some embodiments, if a sample is not matched to a certain cooking event sound, then the match count for such cooking event sound can be reset to zero. Therefore, in such embodiments, the match count for each cooking event sound can indicate the number of consecutive samples that have been matched to such cooking event sound. In other embodiments, the match count is only reset if more than a threshold number of consecutive samples (e.g. three) are not matched to the cooking event sound.

In yet further embodiments, two match counts (e.g. an amplitude match count and a frequency match count) can be maintained for each cooking event sound. Thus, at (314) the amplitude match count can be incremented for each cooking event sound to which the amplitude of the sample was matched at (308) and the frequency match count can be incremented for each cooking event sound to which the frequency of the sample was matched at (310).

At (316) it can be determined whether the audio signal has been matched to a cooking event sound. For example, at (316) it can be determined whether the match count for a cooking event sound exceeds a threshold value. As another example, in embodiments in which two match counts are maintained for each cooking event sound, at (316) it can be determined if both match counts exceed respective threshold values.

In some embodiments, threshold values for identifying matches can be modified or set by the user. The threshold values can be uniform for all cooking event sounds or specific to each cooking event sound. Thus, for example, method (300) can be more sensitive (e.g. use a smaller threshold value for the match counts) to detecting boil-dry conditions and less sensitive (e.g. use a larger threshold value for the match counts) for other cooking event sounds.

If it is determined at (316) that the audio signal has not been matched to a cooking event sound, then method (300) can return to (306) and obtain the next sample. In such fashion, the audio signal can be compared to the plurality of cooking event sounds over a plurality of samples.

However, if it is determined at (316) that the audio signal has been matched to a cooking event sound, then method (300) can proceed to (318). At (318) one or more operations can be performed in response to the cooking event identified at (316). For example, upon identifying a particular cooking event occurring at the cooktop, a cooking event response database can be consulted to determine an appropriate response.

As an example, if a boiling event or boil-dry event is detected, then, in response, the amount of energy provided by the cooktop to the corresponding vessel can be reduced or eliminated. As another example, an alarm message that indicates the identified cooking event can be sent to a user computing device. As a further example, the user may respond to the alarm message with various desired operations for the cooktop appliance to perform (e.g. reduce or eliminate heat).

Although method (300) is shown in FIG. 3 as an iterative sample-by-sample processing approach, other distributions of processing can be used as well. For example, samples can be processed in parallel.

In addition, in some embodiments, multiple matches between the audio signal and different cooking event sounds can be identified at (316). For example, the multiple matches can be different events occurring at different locations (e.g. different cooktop elements) of the cooktop appliance. Alternatively, the multiple events can occur at the same location. As another example, the occurrence of multiple cooking events may be detected by the parallel processing of a plurality of different audio signals respectively captured by a plurality of acoustic sensors.

In response to multiple matches identified at (316), a plurality of operations can be simultaneously and/or sequentially performed at (318). Furthermore, in some embodiments, a combination of cooking events identified as occurring at the cooktop can result in performance of operations that are non-equivalent to the sum of operations that would be performed in response to identification of each of the combination of cooking events separately. Thus, in some embodiments, the cooking event response database can include a matrix or other data structure that allows identification of an appropriate response for various different combinations of cooking events.

Figure 5:
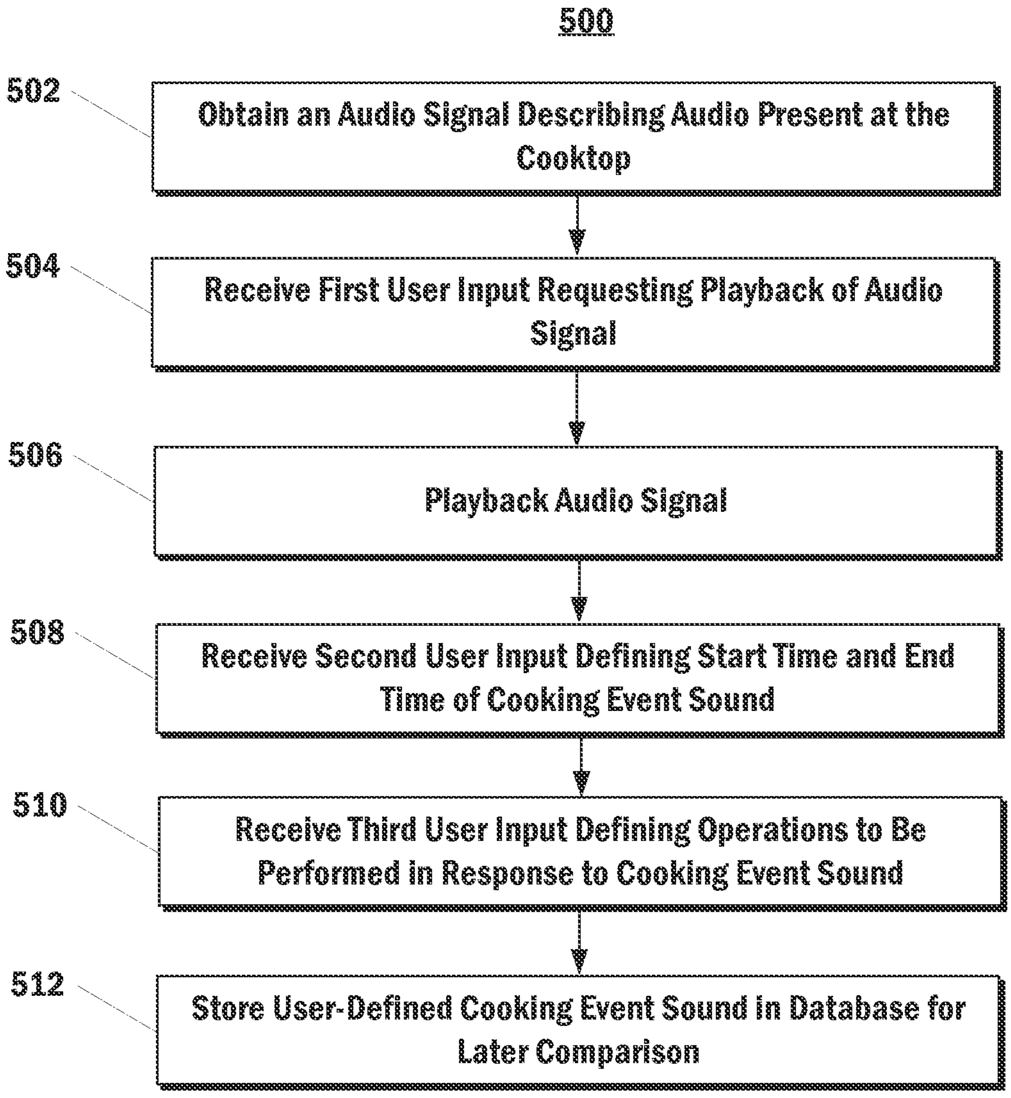
FIG. 5 depicts a flowchart of an example method for operating a cooktop appliance according to an example embodiment of the present disclosure.

FIG. 5 depicts a flowchart of an example method (500) for operating a cooktop appliance according to an example embodiment of the present disclosure. Although FIG. 5 depicts steps performed in a particular order for purposes of illustration and discussion, various steps of method (500) can be omitted, rearranged, combined, performed simultaneously, and/or adapted in various ways without deviating from the scope of the present disclosure.

At (502) an audio signal can be obtained that describes audio present at the cooktop. For example, the audio signal can be audio that was collected by one or more acoustic sensors mounted at the cooktop. The audio signal can be amplified and then provided to a controller implementing method (500).

In some embodiments, additional information associated with the current operational state of the cooktop appliance can also be obtained or otherwise stored along with the audio signal. As an example, if a right front burner of the cooktop appliance is currently operating at 75% power, then such operational information can be collected and stored along with the audio signal that is simultaneously collected. In such fashion, the sounds included in the audio signal can be cross-references or otherwise contextualized so that future use of the audio signal may be more intelligent or informed.

At (504) a first user input that requests playback of the audio signal can be received. For example, the first user input can be received via a user interface of the cooktop appliance. As another example, the first user input can be received by the cooktop appliance from a user computing device over a network.

At (506) the audio signal can be played. For example, the cooktop appliance can playback the audio signal over one or more speakers included in the cooktop appliance. As another example, the cooktop appliance can transmit the audio signal to a user computing device. The user computing device can playback the audio signal to the user.

At (508) a second user input can be received. The second user input can define start time and an end time of a cooking event sound included within the audio signal. For example, the user can interact with a user interface of the cooktop appliance to indicate a start time and an end time of the cooking event sound during playback of the audio signal at (506). As another example, the second user input can be provided by the user via a tool that allows the user to visually indicate the start time and the end time of the cooking event sound versus a graphical depiction of the audio signal.

In some embodiments, the second user input received at (508) can also provide additional information concerning the cooking context of the selected audio. For example, the second user input can indicate the style of cooking vessel used during capture of the audio signal (e.g. cast iron, large pot, wok, etc.). In some embodiments, the second input may also indicate a recipe or operation being performed by the cooktop appliance during capture of the selected audio (e.g. boiling water, simmering sauce, sautéing vegetables, searing meats). This additional information can be stored along with or otherwise associated with the selected audio so that the resulting cooking event sound has additional context.

At (510) a third user input defining operations to be performed in response to the cooking event sound can be received. For example, the third user input can be received via a user interface of the cooktop appliance. As another example, the third user input can be provided to a user computing device and transmitted to the cooktop appliance over a network.

At (512) the user-defined cooking event sound can be stored in a database for subsequent use in identification of a cooking event occurring at the cooktop. For example, subsequently obtained audio signals can be compared to the user-defined cooking event sound to identify when such cooking event as occurring at the cooktop. In response to such identification, the one or more operations specified by the third user input received at (510) can be performed.

In such fashion, user-defined cooking event sounds can be created and stored to allow the intelligent cooktop audio response to be extended to user-defined situations and cooking events, thereby increasing the flexibility and customizability of the intelligent cooktop appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a cooktop appliance, the method comprising:

receiving, from one or more acoustic sensors positioned at a cooktop of the cooktop appliance, an audio signal;

segmenting the audio signal into a plurality of samples;

comparing an amplitude of the audio signal to an amplitude of each of a plurality of cooking event sounds, wherein the plurality of cooking event sounds are previously stored in a memory and respectively correspond to a plurality of different cooking events, and wherein comparing the amplitude of the audio signal to the amplitude of each of a plurality of cooking event sounds comprises comparing an amplitude of each of the plurality of samples of the audio signal to the amplitude of each of the plurality of cooking event sounds;

comparing a frequency of the audio signal to a frequency of each of the plurality of cooking event sounds, wherein comparing the frequency of the audio signal to the frequency of each of the plurality of cooking event sounds comprises comparing a frequency of each of the plurality of samples of the audio signal to the frequency of each of the plurality of cooking event sounds;

identifying a match between the audio signal and one of the plurality of cooking event sounds based at least in part on the comparison of the amplitudes and the comparison of the frequencies; and in response to identifying the match, performing one or more operations associated with the cooking event associated with the cooking event sound to which the audio signal was matched.

2. The method of claim 1, wherein the plurality of samples are overlapping.

3. The method of claim 1, wherein identifying the match between the audio signal and the one of the plurality of cooking event sounds based at least in part on the comparison of the amplitudes and the comparison of the frequencies comprises:

determining, for each of the plurality of cooking event sounds, a first number of matches between the amplitudes of the plurality of samples and the amplitude of the cooking event sound; and determining, for each of the plurality of cooking event sounds, a second number of matches between the frequencies of the plurality of samples and the frequency of the cooking event sound; and identifying the match between the audio signal and the one of the plurality of cooking event sounds based at least in part on first number of matches and second number of matches for each of the plurality of cooking event sounds.

4. The method of claim 3, wherein determining, for each of the plurality of cooking event sounds, the first number of matches between the amplitudes of the plurality of samples and the amplitude of the cooking event sound comprises determining, for each of the plurality of cooking event sounds, a number of plurality of samples for which a first difference between the amplitude of such sample and the amplitude of the cooking event sound minus a second difference between the amplitude of a previous sequential sample and the amplitude of the cooking event sound is less than a threshold value.

5. The method of claim 3, wherein identifying the match between the audio signal and the one of the plurality of cooking event sounds based at least in part on first number of matches and second number of matches for each of the plurality of cooking event sounds comprises determining that the first number of matches and the second number of matches for the one of the plurality of cooking event sounds respectively exceed a first threshold value and a second threshold value.

6. The method of claim 1, wherein comparing the frequency of the audio signal to the frequency of each of the plurality of cooking event sounds comprises adjusting, for each of the plurality of cooking event sounds, a time axis of the cooking event sound to determine whether the frequency of the audio signal is within a range of frequencies around the frequency of the cooking event sound.

7. The method of claim 1, further comprising storing a portion of the audio signal as a new cooking event sound based at least in part on user input received from a user of the cooktop appliance.

8. The method of claim 7, further comprising storing along with the new cooking event sound one or more operating parameters describing an operating state of the cooktop appliance at the time the portion of the audio signal was captured by the one or more acoustic sensors.

9. The method of claim 5, further comprising receiving a second user input, the second user input specifying one or more operations to be performed upon matching the audio signal to the new cooking event sound.

10. A cooktop appliance, comprising a cooktop;

one or more acoustic sensors, wherein the one or more acoustic sensors are positioned to collect an audio signal present at the cooktop;

a first database storing a plurality of cooking event sounds that respectively correspond to a plurality of different cooking events;

a second database storing a plurality of operations respectively associated with the plurality of different cooking events; and a controller that:

receives the audio signal from the one or more acoustic sensors;

compares the received audio signal to each of the plurality of cooking event sounds;

identifies a match between the received audio signal and one of the plurality of cooking event sounds based at least in part on the comparison, such that one of the plurality of different cooking events is identified as occurring at the cooktop; and in response to the cooking event identified as occurring at the cooktop, performs the operation associated with the identified cooking event in the second database.

11. The cooktop appliance of claim 10, wherein the controller compares the received audio signal to each of the plurality of cooking event sounds by:

comparing an amplitude of the audio signal to an amplitude of each of the plurality of cooking event sounds; and comparing a frequency of the audio signal to a frequency of each of the plurality of cooking event sounds.

12. The cooktop appliance of claim 11, wherein:

the controller further segments the audio signal into a plurality of samples;

wherein comparing the amplitude of the audio signal to the amplitude of each of a plurality of cooking event sounds comprises comparing an amplitude of each of the plurality of samples of the audio signal to the amplitude of each of the plurality of cooking event sounds; and wherein comparing the frequency of the audio signal to the frequency of each of the plurality of cooking event sounds comprises comparing a frequency of each of the plurality of samples of the audio signal to the frequency of each of the plurality of cooking event sounds.

13. The cooktop appliance of claim 10, wherein one or more of the plurality of cooking event sounds that respectively correspond to one or more of the plurality of different cooking events are inputted into the database by a user of the cooktop via a user interface of the cooktop.

14. The cooktop appliance of claim 10, wherein the plurality of operations respectively associated with the plurality of different cooking events can be modified by a user of the cooktop via a user interface of the cooktop.

15. The cooktop appliance of claim 10, wherein the acoustic sensors are mounted to the cooktop such that no air gap exists between the acoustic sensors and the cooktop.

16. The cooktop appliance of claim 10, further comprising one or more amplifiers respectively electrically positioned between the one or more acoustic sensors and the controller, wherein the one or more amplifiers are automatic gain controlled.

17. One or more non-transitory, computer-readable media storing instructions that, when executed by one or more processors, cause the one or more processors to perform operations, the operations comprising:

obtaining an audio signal, the audio signal describing audio at a cooktop of a cooktop appliance;

comparing an amplitude and a frequency of the audio signal against an amplitude and a frequency of each of a plurality of cooking event sounds, the plurality of cooking event sounds respectively corresponding to a plurality of different cooking events, and wherein comparing the amplitude and the frequency of the audio signal against the amplitude and the frequency of each of the plural cooking event sounds comprises:

segmenting the audio signal into a plurality of samples, wherein the plurality of samples are overlapping; and comparing, for each of the plurality of samples, an amplitude and a frequency of such sample against the amplitude and the frequency of each of the plurality of cooking event sounds;

identifying, based at least in part on the comparing, a match between the audio signal and a first cooking event sound of the plurality of cooking event sounds;

in response to the match, performing one or more operations associated with the first cooking event sound.

18. The one or more non-transitory, computer-readable media of claim 17, wherein identifying, based at least in part on the comparing, the match between the audio signal and the first cooking event sound of the plurality of cooking event sounds comprises:

determining, for each of the plurality of cooking event sounds based at least in part on the comparing, a number of the plurality of samples that match such cooking event sound; and identifying the match based at least in part on the number of samples matched to each of the plurality of cooking event sounds.

* * * * *